(12) United States Patent
Endo

(10) Patent No.: US 10,142,334 B2
(45) Date of Patent: Nov. 27, 2018

(54) COMMUNICATING APPARATUS, METHOD, AND COMMUNICATING SYSTEM

(71) Applicant: Shinya Endo, Yamato (JP)

(72) Inventor: Shinya Endo, Yamato (JP)

(73) Assignee: RICOH COMPANY, LTD., Tokyo (JP)

(\*) Notice: Subject to any disclaimer, the term of this patent is extended or adjusted under 35 U.S.C. 154(b) by 82 days.

(21) Appl. No.: 15/205,879

(22) Filed: Jul. 8, 2016

(65) Prior Publication Data

US 2017/0012971 A1 Jan. 12, 2017

(30) Foreign Application Priority Data

Jul. 9, 2015 (JP) ................................. 2015-137511

(51) Int. Cl.
| | | |
|---|---|---|
| H04L 29/06 | (2006.01) | |
| H04W 4/02 | (2018.01) | |
| G06Q 10/10 | (2012.01) | |
| H04W 12/06 | (2009.01) | |
| G06K 9/00 | (2006.01) | |
| H04W 76/30 | (2018.01) | |
| H04W 84/12 | (2009.01) | |

(52) U.S. Cl.
CPC ...... *H04L 63/0861* (2013.01); *G06K 9/00771* (2013.01); *G06Q 10/109* (2013.01); *H04W 4/026* (2013.01); *H04W 12/06* (2013.01); *H04W 76/30* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 9,697,348 | B1* | 7/2017 | Maresh | G06F 21/36 |
| 9,835,709 | B2* | 12/2017 | Tran | G01S 1/68 |
| 2009/0220128 | A1* | 9/2009 | Irimoto | G06K 9/00255 |
| | | | | 382/118 |
| 2010/0079005 | A1* | 4/2010 | Hyde | H02J 17/00 |
| | | | | 307/104 |
| 2010/0117793 | A1* | 5/2010 | Kumagai | G06K 9/20 |
| | | | | 340/5.81 |
| 2010/0130181 | A1* | 5/2010 | Won | G06F 1/1694 |
| | | | | 455/414.1 |
| 2013/0250083 | A1* | 9/2013 | Haley | H04M 1/72577 |
| | | | | 348/77 |
| 2014/0368456 | A1* | 12/2014 | Sakai | G06F 3/0488 |
| | | | | 345/173 |

(Continued)

FOREIGN PATENT DOCUMENTS

| | | |
|---|---|---|
| JP | 2003-078945 | 3/2003 |
| JP | 2009-284442 | 12/2009 |

*Primary Examiner* — Kaveh Abrishamkar
(74) *Attorney, Agent, or Firm* — Oblon, McClelland, Maier & Neustadt, L.L.P.

(57) ABSTRACT

A communicating apparatus, method, and system that capture an image, authenticate a person in the image that has been captured, determine a direction of the person based on a result of authenticating the person, and control transmission of a radio wave in the determined direction to connect a terminal device to a network, and communicate with the terminal device connected to the network by using access information included in the transmitted radio wave.

12 Claims, 11 Drawing Sheets

(56) References Cited

U.S. PATENT DOCUMENTS

| | | | |
|---|---|---|---|
| 2015/0179005 A1* | 6/2015 | Lin | G07C 9/00309 |
| | | | 340/5.61 |
| 2015/0220476 A1* | 8/2015 | Kojima | G06F 21/83 |
| | | | 710/106 |
| 2017/0004293 A1* | 1/2017 | Mantri | G06F 3/017 |
| 2017/0193213 A1* | 7/2017 | Tsou | G06F 21/32 |
| 2017/0206402 A1* | 7/2017 | Suzuki | G06K 9/00087 |

* cited by examiner

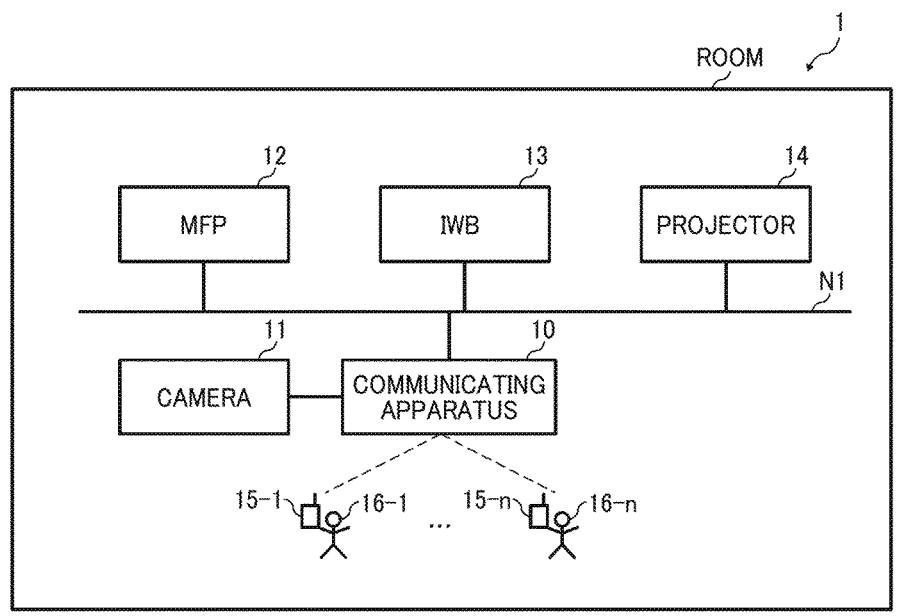
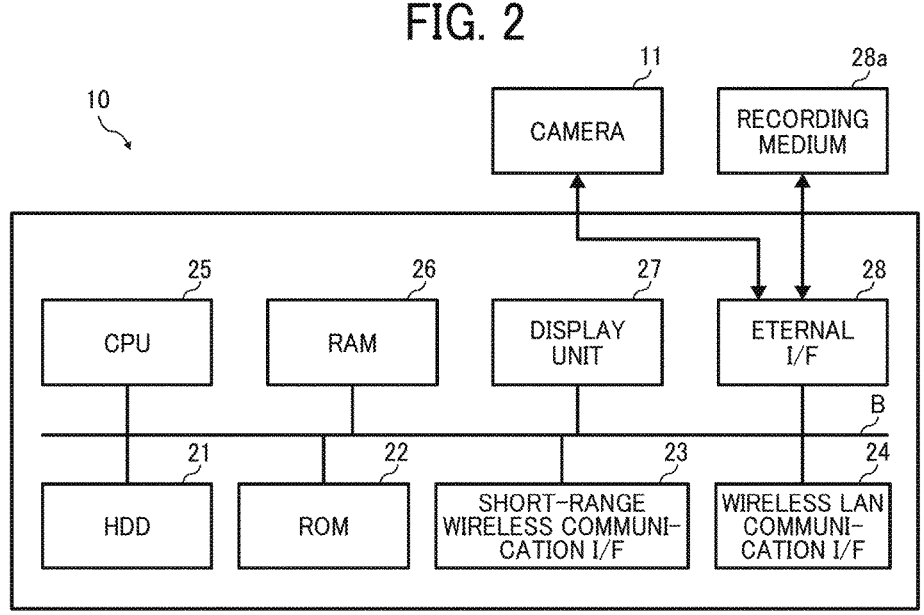

FIG. 6A

USER DB

| USER NAME | FACIAL INFORMATION |
|---|---|
| A | ×××.jpg |
| B | ○○○.png |
| C | △△△.bpm |
| ... | ... |

FIG. 6B

MEETING INFORMATION

| MEETING NAME | MEETING START TIME | MEETING FINISH TIME | MEETING ROOM | COMMUNICATING APPARATUS ID | ATTENDEE |
|---|---|---|---|---|---|
| ○○ | 12:00 | 15:00 | 101 | 1111 | A,B,C |
| ×× | 15:00 | 16:00 | 102 | 1112 | D,E,F |
| ... | ... | ... | ... | ... | ... |

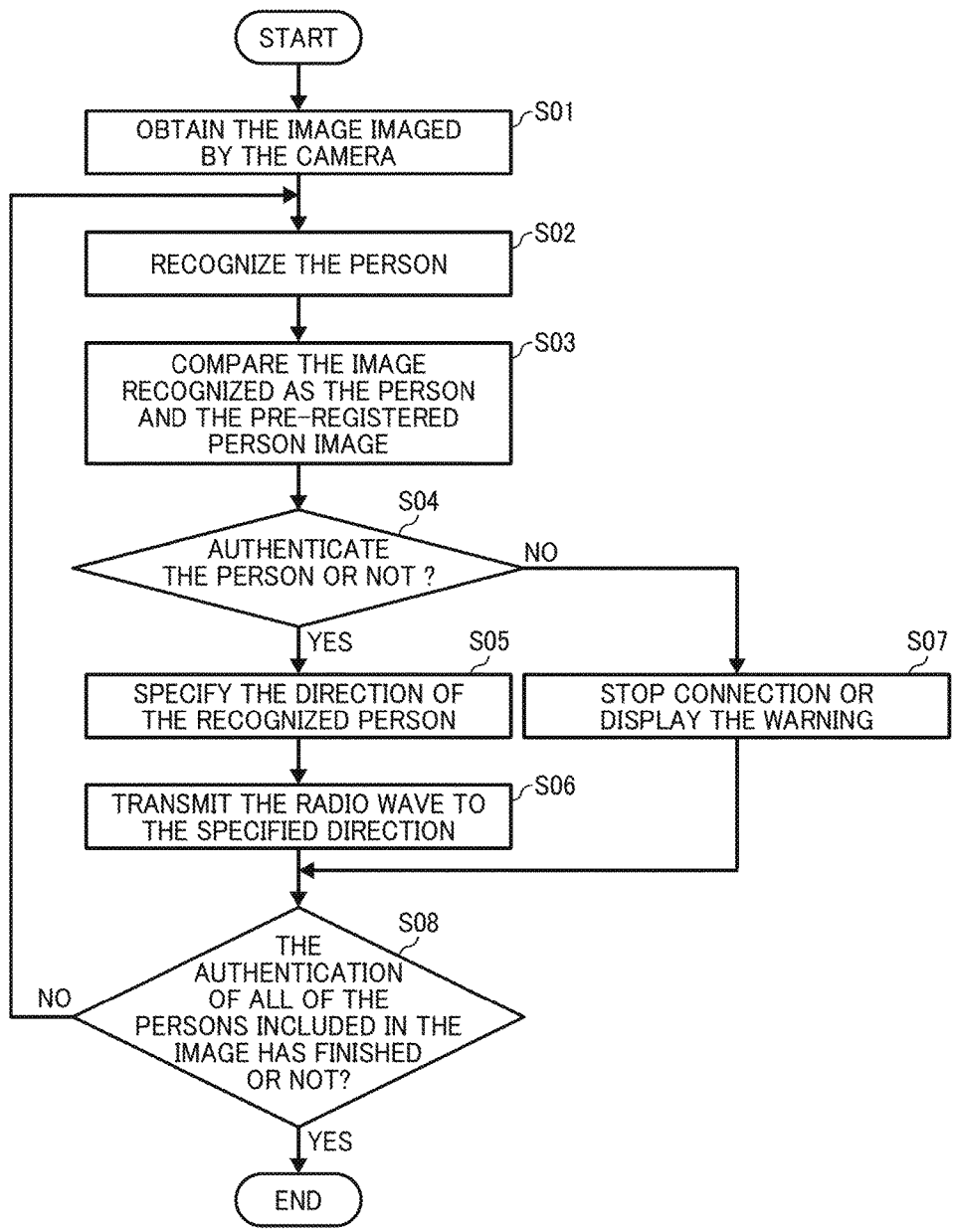

PERPENDICULAR LINE

COMMUNICATING APPARATUS, METHOD, AND COMMUNICATING SYSTEM

CROSS-REFERENCE TO RELATED APPLICATIONS

The present application claims priority to and incorporates by reference the entire contents of Japanese Patent Application No. 2015-137511 filed in Japan on Jul. 9, 2015.

BACKGROUND

1. Field

The present disclosure relates to a communicating apparatus, a communicating system, and a computer readable recording medium storing a program for causing a computer to execute a processing.

2. Description of the Related Art

For example, so that all of meeting participants share a display in a meeting, a network for the meeting is formed by connecting a plurality of personal devices to each other. Thereby, there is an increase in the amount of data that is shared among all of the meeting participants. During the meeting, sensitive information (information that is meant to be concealed) is created. As such, it may not be favorable for other meeting participants to see the meeting participant enters a meeting room and is detected by distance information (distance from the participant's device to the communication apparatus), and then the meeting participant's device is connected via WiFi (registered trademark) by the detected distance information is known. Further, it is known that when a correspondence between a person and communication terminal is automatically recognized, the corresponding person is provided meeting dates/information or functions that a communication terminal has.

SUMMARY

It is an object of the present disclosure to solve the problems in the conventional technology.

The present disclosure is drawn to a communicating apparatus, method, and system that capture an image, authenticate a person in the image that has been captured, determine a direction of the person based on a result of authenticating the person, and control transmission of a radio wave in the determined direction to connect a terminal device to a network, and communicate with the terminal device connected to the network by using access information included in the transmitted radio wave. The above and other objects, features, advantages and technical and industrial significance of this invention will be better understood by reading the following detailed description in connection with the accompanying drawings.

BRIEF DESCRIPTION OF THE DRAWINGS

FIG. is a diagram of an exemplary communicating system configuration according to the first embodiment;

FIG. 2 is a diagram of an exemplary hardware configuration of a communicating apparatus according to the first embodiment;

FIGS. 6A and 6B are diagrams of exemplary data;

FIG. 7 is a flowchart of a first example of communication controlling procedure;

DETAILED DESCRIPTION

Figure 3:
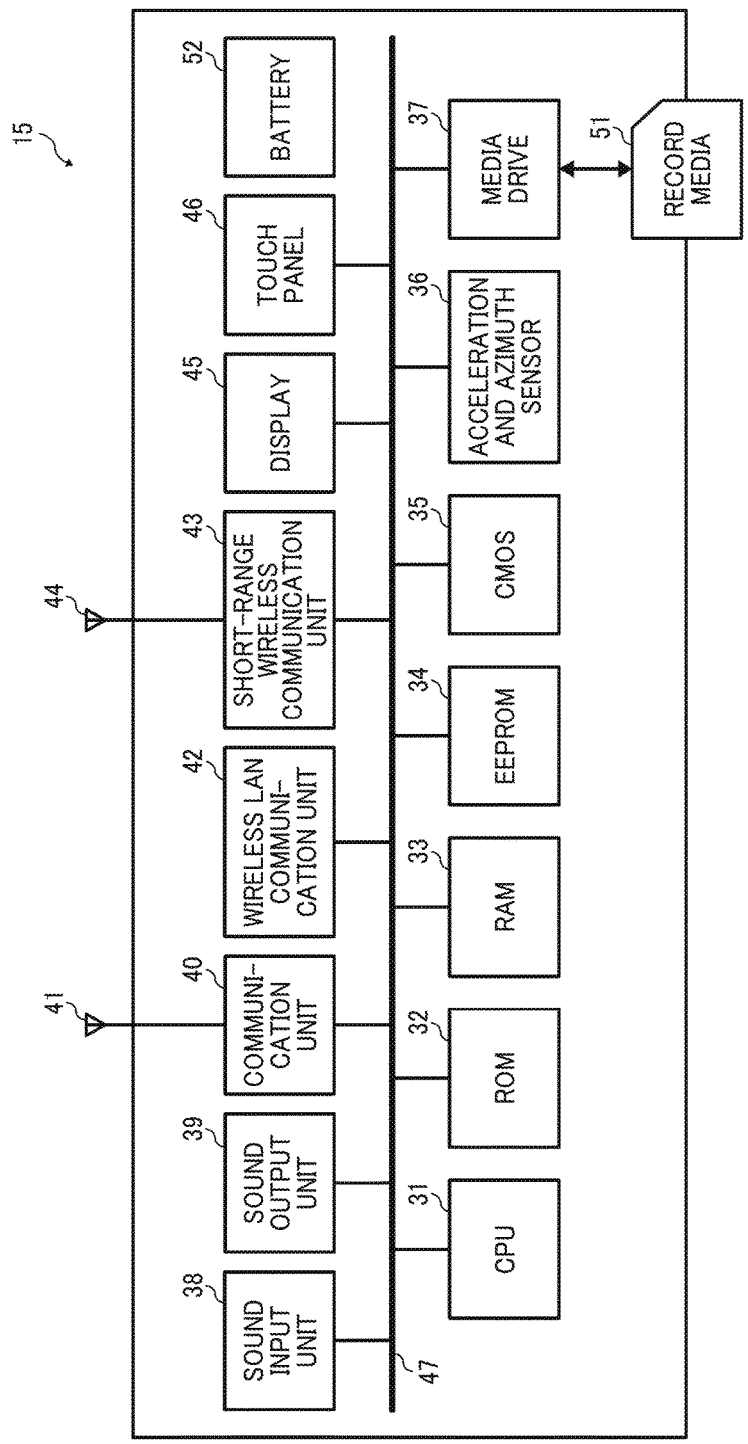
FIG. 3 is a diagram of an exemplary hardware configuration of a user terminal according to the first embodiment.

Next, embodiments of the present disclosure will be described in detail.

First Embodiment

System Configuration

FIG. 1 is a diagram of an exemplary communicating system configuration according to the first embodiment. An example of a communicating system 1 shown in FIG. 1 includes a communicating apparatus 10, a camera 11, Multifunction Peripheral (MFP) 12, Interactive White Board (IWB) 13, a projector 14, and one or more user terminals 15 in a predetermined area, for example, a room or a meeting room.

The communicating system 1 connects the communicating apparatus 10, MFP 12, IWB 13, and the projector 14 via the network N1 of, for example, Local Area Network (LAN). The network N1 of FIG. 1 may be used by any of a wired LAN communication or a wireless LAN communication.

Then, the communicating apparatus 10 is able to access one or more user terminals 15 via one or more communicating unit among the wired LAN, Bluetooth (registered trademark) Low Energy (BLE) communication, and WiFi communication in the communicating system 1.

The communicating apparatus 10 is an example of an access point, for example, and the communicating apparatus 10 is realized by, for example, the wireless LAN router or WiFi router. Then, the communicating apparatus 10 is able to execute BLE communication with the user terminal 15 which exists in the BLE range. The communicating apparatus 10 provides access setting information (connection information) with the user terminal 15 entered in the BLE range by using BLE communication. Furthermore, BLE communication is an example of short-range communication.

The camera 11 is an example of an imaging device (imaging unit). The camera 11 is, for example, an omnidirectional camera which images an omnidirectional (surroundings) image on the basis of the communicating apparatus 10, but is not limited by this. The camera 11 may be connecting to the communicating apparatus 10 as an external device, or built in to the communicating apparatus 10. The camera 11 images the omnidirectional image based on camera parameters, for example, predetermined angle of view and resolution. The camera 11 has, for example, an Auto Focus (AF) function.

For example, the communicating apparatus 10 measures focal distance of each azimuth (direction) based on the omnidirectional image obtained by the camera 11. The communicating apparatus 10 may be calculating an external form (size) of the room (predetermined area) based on the measured focal distance. Then, the communicating apparatus 10, for example, measures distance between the communicating apparatus 10 and each of walls of the room (grasping physical space) or person recognition in the room. The communicating apparatus 10 adjusts a transmission range of a communication radio wave according to the result or the measuring.

For example, the communicating apparatus 10 analyzes images obtained by the camera 11. For example, if the communicating apparatus 10 transmits a directional radio wave (for example, an ultrasonic wave), the communicating apparatus 10 is able to transmit the radio wave only in the direction (direction having predetermined angle width) of a pre-registered person which is confirmed by a person recognition process. Then, if there is a person that has not been registered, the communicating apparatus 10 may stop transmitting the radio wave in the direction of the person or cut off connection to the user terminal 15 in the direction.

Then, the communicating apparatus 10 analyzes the images obtained by the camera 11. If the communicating apparatus 10 transmits a non-directional radio wave, so that the communicating apparatus 10 is able to communicate with the user terminal 15 by distance (for example, minimum distance) adjusted among minimum distance and maximum distance between the communicating apparatus 10 and each of walls of the room, the communicating apparatus 10 adjusts the strength of the radio wave. Then, the communicating apparatus 10 transmits the adjusted radio wave. If there is a person who is not registered in the user DB, based on the result of analyzing the image obtained by the camera 11, the communicating apparatus 10 may output a warning or stop/cut off connection to a part or the entire user terminal 15.

MFP 12, IWB 13, and the projector 14 are each an example of an electric device that communicates with the user terminal 15. MFP 12 has at least one function of copy, printer, scanner, facsimile, imaging and image forming. IWB 13 is an example of an image display device displaying, for example, documents used in a meeting or contents obtained from a device on the network N1. The projector 14 is an example of an image projection device projecting, for example, documents used in a meeting or contents on, for example, a predetermined screen or wall.

The user terminals 15-1 to 15-n (generically referred to as user terminal 15 as applicable) are terminal devices operated by each of the user 16-1 to 16-n (generically referred to as user 16 as applicable). The user terminal 15 is, for example, a smart phone, a mobile phone, a note personal computer, and a tablet terminal. The user terminal 15 is able to access the communicating apparatus 10 by using, for example, BLE communication, WiFi communication, and wireless LAN communication.

<Hardware Configuration>

The communicating apparatus 10 is realized by, for example, a hardware configuration as illustrated in FIG. 2. FIG. 2 is a diagram of an exemplary hardware configuration of a communicating apparatus according to the first embodiment.

The communicating apparatus 10 has, for example, HDD 21, ROM (Read Only Memory) 22, a short-range wireless communication I/F (interface) 23, a wireless LAN communication I/F 24, CPU (Central Processing Unit) 25, RAM (Random Access Memory) 26, a display unit 27, and an eternal I/F 28. The communicating apparatus 10 may be a computer that includes HDD 21, ROM 22, a short-range wireless communication I/F 23, a wireless LAN communication I/F 24, CPU 25, RAM 26, a display unit 27, and an eternal I/F 28 connected to each other via bus B.

HDD 21 is an example of a nonvolatile storage device in which programs and data are stored. The programs and data are, for example, OS (Operating System) which is basic software controlling all of the communicating apparatus 10, and application software (generically referred to as the application) which provides various functions on the OS. Furthermore, the communicating apparatus 10 may not include HDD 21, but rather a drive device (for example, a Solid State Drive (SSD)) which uses a flash memory as a recording medium.

ROM 22 is an example of a nonvolatile semiconductor memory (storage device) capable of holding the programs and data when the power is turned off. The programs and data of, for example, BIOS, the setting of the OS, and the setting of the network are stored in ROM 22.

The short-range wireless communication I/F 23 communicates with the user terminal 15 by short-range wireless communication. The wireless LAN communication I/F 24 communicates with the user terminal 15 and the projector 14 by the wireless LAN communication. The short-range wireless communication I/F 23 and the wireless LAN communication I/F 24 are able to transmit one of directional radio wave or non-directional radio wave. The short-range wireless communication I/F 23 and the wireless LAN communication I/F 24 switch the directional radio wave and the non-directional radio wave, and are able to transmit the switched radio wave.

CPU 25 is an arithmetic device which reads the program or data from the storage device of, for example, ROM 22 and HDD 21 on RAM 26, and realizes the control or the function of the entire communicating apparatus 10 by executing the program.

RAM 26 is an example of a nonvolatile semiconductor memory (storage device) which temporarily holds the programs and data. The display unit 27 displays, for example, a condition of the communicating apparatus 10 by using, for example, an LED (Light Emitting Diode).

The eternal I/F 28 is an interface to connect with an eternal device. The eternal device may be, for example, the camera 11 and the recording medium 28a, as described above. For example, the communicating apparatus 10 is able to obtain the image imaged by the camera 11 via the eternal I/F 28. Furthermore, the camera 11 may be built into the communicating apparatus 10. The communicating apparatus 10 is able to read and/or write to the recording medium 28a via the eternal I/F 28. The recording medium 28a may be, for example, a flexible disk, a CD, a DUD, an SD memory card, and USE memory. The communicating apparatus 10 is able to realize various processes as described below by, for example, the hardware configuration shown in FIG. 2.

<User Terminal>

FIG. 3 is a diagram of an exemplary hardware configuration of a user terminal according to the first embodiment. The user terminal 15 of FIG. 3 is a computer which includes CPU 31, ROM 32, RAM 33, EEPROM (Electrically Erasable Programmable Read-Only Memory) 34, CMOS (Complementary Metal Oxide Semiconductor) sensor 35, an acceleration and azimuth sensor 36, and a media drive 37. Furthermore, the user terminal 15 may be a computer which has a sound input unit 38, a sound output unit 39, a communication unit 40, an antenna 41, a wireless LAN communication unit 42, a short-range wireless communication unit 43, an antenna for the short-range wireless communication 44, a display 45, a touch panel 46, and a bus line 47.

CPU 31 controls operation of the entire user terminal 15. A basic input and output program is stored in ROM 32. RAM 33 is used as a work area of CPU 31. EPROM 34 executes reading or writing of the data according to the control of CPU 31. CMOS sensor 35 images a subject and obtains the image data according to the control of CPU 31. The acceleration and azimuth sensor 36 is, for example, a magneto electronic compass which detects geomagnetism, a gyrocompass, or an acceleration sensor.

The media drive 37 controls reading or writing (storing) of the data in regard to a record media 51 of, for example, a flash memory. The media drive 37 is configured such that the record media 51 is able to be freely attached to and detached from the media drive 37. The data recorded previously in the record media 51 is read by the media drive 37 and new data is written in the record media 51 by the media drive 37.

Furthermore, for example, the OS executed by CPU 31 and association information required for setting network is stored in EEPROM 34. The applications to execute various processes in the present embodiment are stored in, for example, EEPROM 34 or the record media 51.

CMOS sensor 35 is a charge coupled device which converts light to electric charge and produce an image of the subject. If CMOS sensor 35 is able to image the subject, CMOS sensor 35 may be, for example, a CCD (Charge Coupled Device).

The sound input unit 38 converts sound to a sound signal. The sound output unit 39 converts the sound signal to the sound. The communication unit 40 communicates with a nearest base station to use the wireless communication signal via the antenna 41. The wireless LAN communication unit 42 executes the wireless LAN communication according to the IEEE standard 804.11 with an access point of, for example, the communicating apparatus 10. The short-range wireless communication unit 43 executes the short-range wireless communication of, for example, BLE communication using the antenna for the short-range wireless communication 44 with, for example, the communicating apparatus 10.

The display 45 is, for example, a liquid crystal or organic EL which displays the image of the subject or a variety of icons. The touch panel 46 is mounted on the display 45 and configured with a pressure sensitive panel or an electrostatic panel. The touch panel 46 detects the touch position on the display 45 according to a touch by, for example, finger(s) or a touch pen. The bus line 47 is, for example, an address bus or a data bus to electrically connect each of the above-described components.

The user terminal 15 has a dedicated battery 52, and is driven by the battery 52. Furthermore, the sound input unit 38 includes a microphone inputting the sound. The sound output unit 39 includes a speaker outputting the sound. The user terminal 15 is able to realize various processes as described below, for example, by the hardware configuration shown in FIG. 3.

<Software Configuration>
<The User Terminal>

Figure 4:
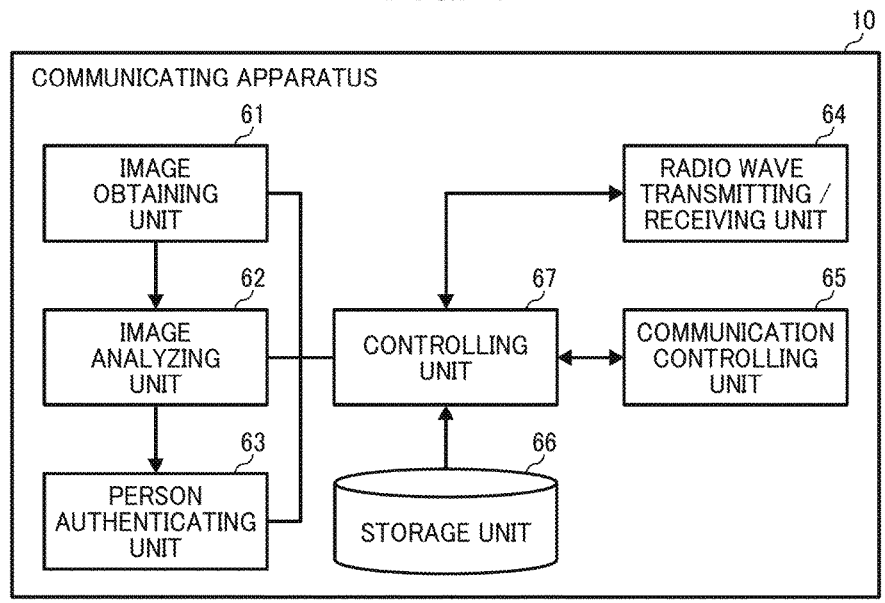
FIG. 4 is a block diagram of an exemplary processing of the communicating apparatus according to the first embodiment.

The communicating apparatus 10 according to the first embodiment is realized by, for example, a processing block shown in FIG. 4. FIG. 4 is a block diagram of an exemplary processing of the communicating apparatus according to the first embodiment.

The communicating apparatus 10 realizes an image obtaining unit (an example of an image obtaining unit) 61, an image analyzing unit (an example of an image analyzing unit) 62, a person authenticating unit (an authenticating unit) 63, a radio wave transmitting/receiving unit (an example of communicating unit) 64, a communication controlling unit (an example of communication controlling unit) 65, a storage unit 66, and a controlling unit 67 by executing the installed application.

The image obtaining unit 61 receives the image data imaged by the camera 11. Furthermore, if the camera 11 is incorporated in the communicating apparatus 10, the image obtaining unit 61 provides a function as an imaging unit. The image obtaining unit 61 obtains, for example, the image data by the omnidirectional imaging.

The image analyzing unit 62 analyzes the image obtained from the camera 11. The image analyzing unit 62 grasps the size (space) of the room(s) (for example, meeting room) or recognizes (a person recognition process) whether there is at least one person included in the image or not. For example, it is possible that the image analyzing unit 62 obtains the size of the room by the distance between the position of the camera 11 and the wall in the predetermined direction based on the position of the camera 11, but it is not limited to this. It is possible that the image camera 11 recognizes the person by, for example, the facial contour, the feature information and the body type information, but it is not limited to this.

If the image analyzing unit 62 recognizes the person by the person recognition process, the image analyzing unit 62 obtains information in association with the direction and the position of the recognized person. The direction of the person is, for example, the direction of the user (the person) or the direction of the user terminal 15 of/held by the user 16. The direction and the position are, for example, the direction and the position based on the position of the communicating apparatus 10 transmitting the radio wave. The image analyzing unit 62 obtains, for example, the direction and/or the position based on the communicating apparatus 10. The image analyzing unit 62 determines the position of the direction and/or the position of the person.

If the image analyzing unit 62 recognizes the person in the image, the person authenticating unit 63 executes an authenticating processing of whether the recognized person and the person information (for example, the facial image information) pre-stored in the storage unit 66 are the same person or not. It is possible that the person authenticating unit 63 determines whether the persons are the same or not by the degree of similarity based on various feature information, for example, the arrangement information of the feature point of outlines, color, eye or mouth of the face. If, for example, the degree of similarity described above meets or exceeds a prescribed/predetermined value, the person authenticating unit 63 determines that the persons are the same. It is possible that the information stored in the storage unit 66 is referred to via the controlling unit 67.

The radio wave transmitting/receiving unit 64 is, for example, the short-range wireless communication unit which transmits/receives the wireless radio wave. For example, the radio wave transmitting/receiving unit 64 obtains the direction of the authenticated person from the image analyzing unit 62 based on the authentication result obtained by the person authenticating unit 63. The radio wave transmitting/receiving unit 64 transmits the radio wave for communication in the obtained direction. The radio wave transmitting/receiving unit 64 transmits the radio wave including the access information (the authentication information) to connect with the network Ni. The radio wave transmitting/receiving unit 64 receives the radio wave from each of the user terminals 15.

The communication controlling unit 65 controls the intensity of the transmission range (including the direction) of the radio wave. For example, the communication controlling unit 65 accesses the network to use the access information included in the radio wave transmitted by the radio wave transmitting/receiving unit 64. If a person is not authenticated as a result of authentication by the person authenticating unit 63, the communication controlling unit 65 interrupts or stops to transmit the radio wave. If the person is not authenticated as a result of authentication by the person authenticating unit 63, the communication controlling unit 65 may output a predetermined warning. The communication controlling unit 65 may control the radio wave transmitting/receiving unit 64 to transmit the directional radio wave or the non-directional radio wave, or control the radio wave transmitting/receiving unit 64 to switch between the directional radio wave and the non-directional radio wave.

The storage unit 66 stores, for example, person information used to authenticate by the person authentication process, person attendance, for example, a target room (for example, the meeting room), time information, information in association with the user terminal 15, or access setting information for transmitting to the user terminal 15. The controlling unit 67 controls each of configurations in the communicating apparatus 10. For example, the controlling unit 67 controls the communication controlling unit 65 to set a communication range based on the result of image analysis. Furthermore, the communication range includes not only the radio wave intensity to be transmitted but also, for example, the transmission direction of the directional radio wave.

<The User Terminal>

Figure 5:
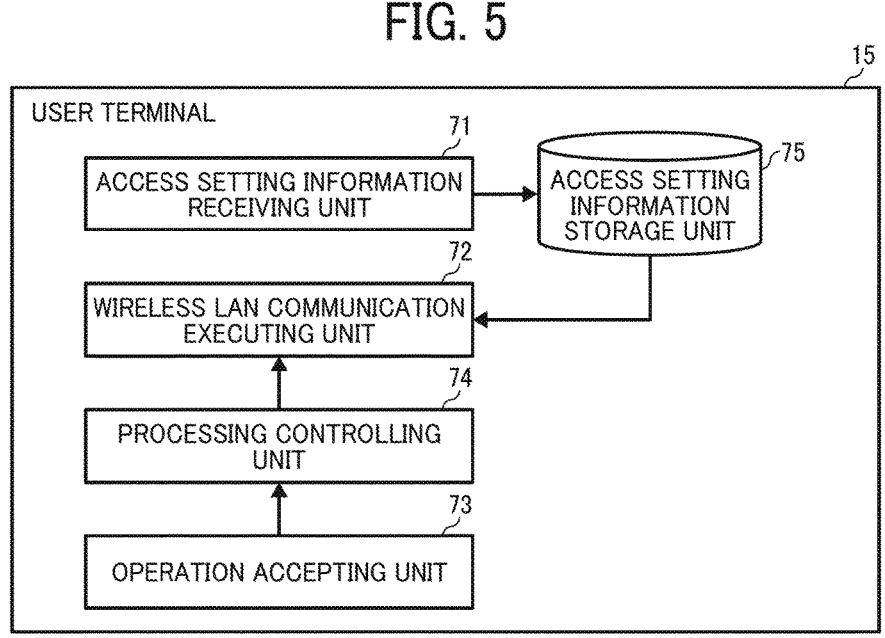
FIG. 5 is a block diagram of an exemplary processing of the user terminal according to the first embodiment.

The user terminal 15 according to the first embodiment is realized by, for example, a processing block shown in FIG. 5. FIG. 5 is a block diagram of an exemplary processing of the user terminal according to the first embodiment.

The user terminal 15 realizes an access setting information receiving unit 71, a wireless LAN communication executing unit 72, an operation accepting unit 73, a processing controlling unit 74, and an access setting information storage unit 75 by executing the installed application.

For example, the access setting information receiving unit 71 receives access setting information from the communicating apparatus 10 by the BLE communication. The access setting information receiving unit 71 stores the received access setting information in the access setting information storage unit 75. The wireless LAN executing unit 72 executes the wireless LAN communication with the communicating apparatus 10 to use the access setting information stored in the access setting information storage unit 75.

The operation accepting unit 73 accepts operation from a user. The processing controlling unit 74 executes processing in response to the operation from the user. If it is necessary that the user terminal 15 communicates with electronic device of, for example, MFP 12 in processing in response to the operation from user, the processing controlling unit 74 executes the wireless LAN communication to use the wireless communication executing unit 72.

In the communicating system 1 as described above, the communicating apparatus 10 ensures safety by, for example, limiting a connection range to be subject to person authentication, or executing communication controlling of, for example, adjusting the radio wave intensity to determine the size of the meeting room. As described above, the communicating apparatus 10 in the present first embodiment recognizes a person and determines a predetermined area to use the camera 11. It is possible that the communicating apparatus 10 adjusts the range to transmit the radio wave. Therefore, it is possible to easily form a network of a limited area (range) to transmit the radio wave.

<Example of Data>

The example of data applied in the present first embodiment is described using FIG. 6. FIG. 6A indicates an example of a user DB (database). FIG. 6B indicates an example of meeting information; this information is stored in the storage unit 66.

The exemplary items of the user DB shown in FIG. 6A are, for example, a user name and facial information. However, the type of information is not limited to this. The user name is information to identify the user. For example, the user name is a user ID, but is not limited to this. The facial information is, for example, a facial image data (a still picture or a motion picture), but is not limited to this. For example, the facial information may be feature information after analysis of the face (for example, color information, characteristic information of an eye or a mouth).

The exemplary items of the meeting information shown in FIG. 6B are, for example, a meeting name, a meeting start time, a meeting finish time, a meeting room, a communicating apparatus ID, and an attendee, but is not limited to this. The meeting name is information to identify the meeting. The meeting start time and the meeting finish time are information to define the meeting start and the meeting finish time for each of the meeting name. The communicating apparatus ID is an identification number of the communicating apparatus (for example, the user terminal 15 of the attendee of the meeting) used in the meeting room. The attendee is information to identify the attendee of the particular meeting.

Furthermore, the information stored in the storage unit 66 are not limited to this. For example, the information in association with the radio wave intensity in regard to the transmission distance of the radio wave is stored in the storage unit 66. If there is any person other than the registrant (for example, A, B, and C in meeting "○○" in FIG. 6B. in the meeting room), the communication control information is stored in the storage unit 66. The communication control processing result (the log information) is stored in the storage unit 66. Further, for example, the access setting information to communicate with the terminal is stored in the storage unit 66.

<The Detail of Processing>

The detail of processing of the communicating system according to the present embodiment is described below.

<The First Embodiment of the Communication Control Procedure>

FIG. 7 is a flowchart of a first example of communication controlling procedure. The example of FIG. 7 indicates an example of the communication control in the case of transmitting the directional radio wave (for example, the beam forming) along with executing the person authentication. In the example of FIG. 7, the communicating apparatus 10 in the communicating system 1 obtains the image imaged by the camera 11 (S01). The image analyzing unit 62 analyzes the image obtained by the processing of S01 and recognizes the person in the image (S02).

Next, the person authenticating unit 63 of the communicating apparatus 10 compares the facial image obtained as the person recognition result by the processing of S02, and the pre-registered person image (S03). In the processing of S03, the communication 10 obtains the person image in association with the attendee of the meeting executed in the target room (for example, the meeting room) from the storage unit 66. The communication 10 compares the obtained image and the image with which the person authenticating unit 63 executes the person recognition.

After the processing of S03, the communicating apparatus 10 determines whether the person authentication unit 63 can authenticate the person or not (S04). If the person authentication unit 63 can authenticate the person (YES in S04), the communication controlling unit 65 specifies (determines) the direction of the person based on the image obtained by S01 (S05). The communication controlling unit 65 connects (or maintains the connection) with the network to transmit the radio wave in the specified direction (S06).

In the processing of S04 described above, if the person authentication unit 63 cannot authenticate the person (NO in S04), the communication controlling unit 65 releases the connection in regard to the direction (for example, stops transmitting the communication radio wave). The communicating apparatus 10 displays a warning (for example, lighting a warning lamp) (S07). Furthermore, in the processing of S07, it is possible that any or both of releasing the connection and displaying the warning are executed. The warning may be, for example, a notification by sound, but is not limited to this.

After the processing of S06 or S07, the communicating apparatus 10 determines whether the authentication of all of the persons included in the image has finished or not (S08). If the authentication in regard to all of the persons included in the image has not finished (NO in S08), the processing returns to S02.

In the processing of S08, if the authentication of all of the persons included in the image has finished (YES in S08), the communicating apparatus 10 finishes the communication control processing. In the example of FIG. 7 described above, the communicating apparatus 10 analyses the image obtained by the camera 11. The communicating apparatus 10 recognizes the person, and transmits the radio wave in the direction of the person recognized to match the pre-registered person. If the communicating apparatus 10 can recognize the person in the image, the communicating apparatus 10 compares the recognized person and the pre-registered person. If the communicating apparatus 10 determines the recognized person to match the pre-registered person, the communicating apparatus 10 only transmits the radio wave in the direction of the recognized person who has been determined to match the pre-registered person. Therefore, it is possible to prevent a connection with a person that is other than the pre-authenticated person.

<The Specific Example of the Communication Control Processing>

Figure 8:
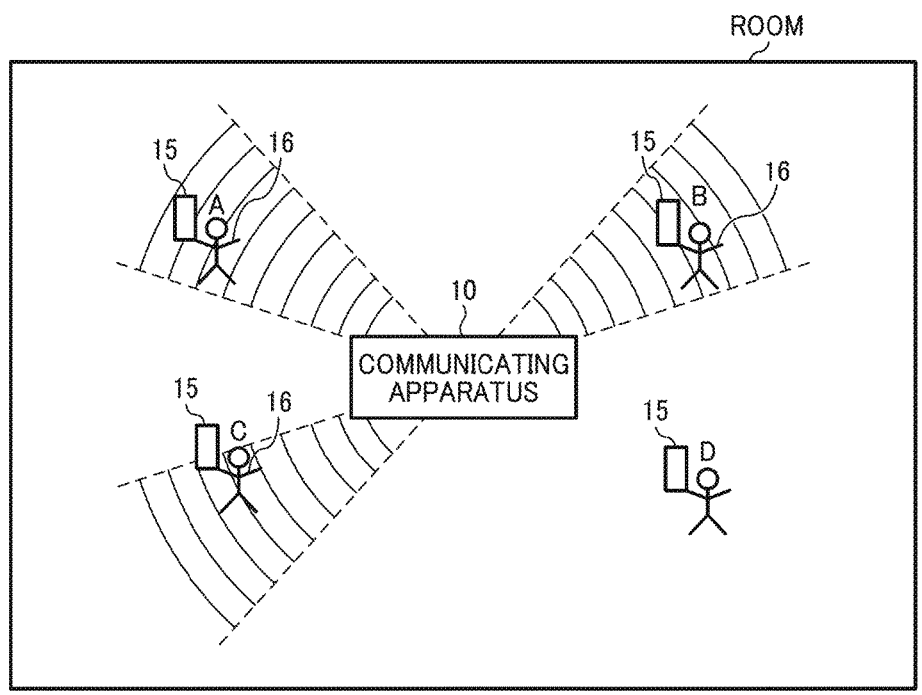
FIG. 8 is a diagram for explaining a specific example of communication control processing according to the first example.

FIG. 8 is a diagram for explaining a specific example of a communication control processing according to a first example. In the example of FIG. 8, there are four persons A, B, C and D in a room (for example, the meeting room). Each of the persons A, B, C and D has a user terminal 15. The communicating apparatus 10 can communicate with the user terminal 15. According to the area in which the person is located, the communicating apparatus 10 transmits the radio wave in the direction corresponding to the person.

In the first example, if persons A, B and C (users 16) are the attendees of the meeting executed in the room, person D would not be authenticated. In this case, as illustrated in FIG. 8, the communicating apparatus 10 transmits the radio wave for connection in the direction (including the predetermined angle range) in which each of persons A, B and C is located. Thereby, the communicating apparatus 10 forms the network. The communicating apparatus 10 does not transmit the radio wave in the direction in which person D is located as this person has not been authenticated. Therefore, in the first example, it is possible to easily form a network that is limited to the transmission area of the radio wave.

<The Second Example of the Communication Control Procedure>

Figure 9:
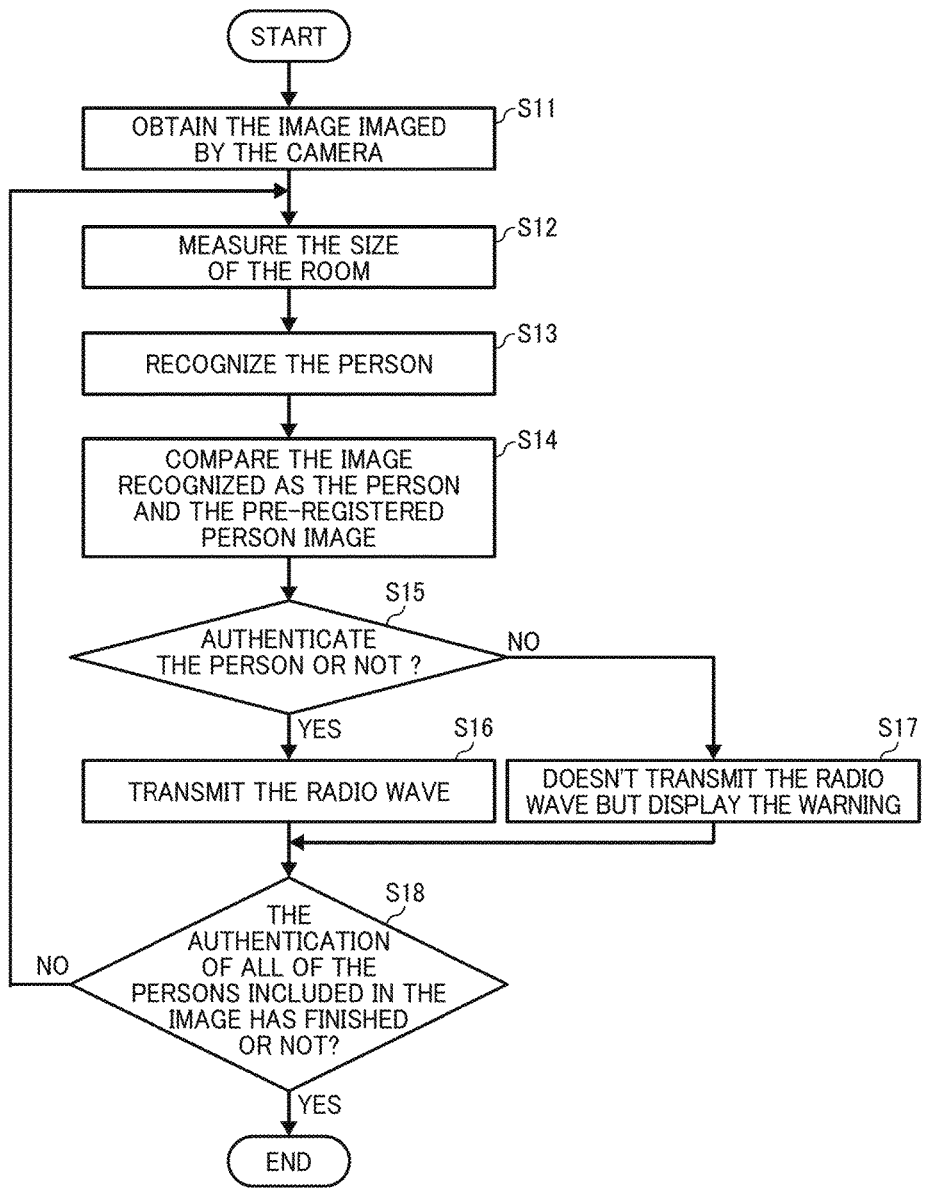
FIG. 9 is a flowchart of a second example of communication controlling procedure.

Next, a second example of the communication control procedure is described. FIG. 9 is a flowchart of a second example of a communication controlling procedure. The example of FIG. 9 indicates the example of the communication control in the case of transmitting a non-directional radio wave along with authenticating the person. In the example of FIG. 9, the communicating apparatus 10 in the communicating system 1 obtains the image imaged by the camera 11 (S11). Next, the image analyzing unit 62 analyzes the image obtained by the processing of S11. The image analyzing unit 62 measures the size (for example, the distance from the camera 11 to the wall in the space of the room) of the room (S12). Next, the image analyzing unit 62 recognizes the person (S13).

Next, the person authenticating unit 63 of the communicating apparatus 10 compares the facial image obtained as the person recognition result by the processing of S12, and the pre-registered person image (S14). In the processing of S14, the communicating apparatus 10 obtains, for example, the person image in association with the attendee of, for example, the meeting held in the target room (for example, the meeting room) from the storage unit 66. The communicating apparatus 10 compares the obtained image and the image with which the person authenticating unit 63 executes the person recognition.

After the processing of S14, the communicating apparatus 10 determines whether the person authentication unit 63 can authenticate the person or not (S15). If the person authentication unit 63 can authenticate the person (YES in S15), the communicating apparatus 10 transmits the radio wave (S16). If the person authentication unit 63 cannot authenticate the person (NO in S15), the communicating apparatus 10 does not transmit the radio wave and displays the warning (S17).

After the processing of S16 or S17, the communicating apparatus 10 determines whether the authentication of all of the persons included in the image has finished or not (S18). If the authentication of all of the persons included in the image has not finished (NO in S18), the processing returns to S12.

In the processing of S18, if the authentication of all of the persons included in the image has finished (YES in S18), the communicating apparatus 10 finishes the communication control processing. In the example of FIG. 9 described above, the communicating apparatus 10 analyses the image obtained by the camera 11. Further, the communicating apparatus 10 measures the size of the room and recognizes the person. If the communicating apparatus 10 recognizes the person to match the pre-registered person, the communicating apparatus 10 transmits the radio wave in the direction of the person recognized to match the pre-registered person. If the communicating apparatus 10 can recognize the person in the image, the communicating apparatus 10 compares the recognized person and the pre-registered person. If the communicating apparatus 10 determines the recognized person and matches the pre-registered person, the communicating apparatus 10 only transmits the radio wave in the direction of the recognized person who has been determined to match the pre-registered person. Therefore, it is possible to prevent a connection with a person other than the pre-authenticated person.

<The Method to Measure the Size of the Room by Using the Camera 11>

Figure 10:
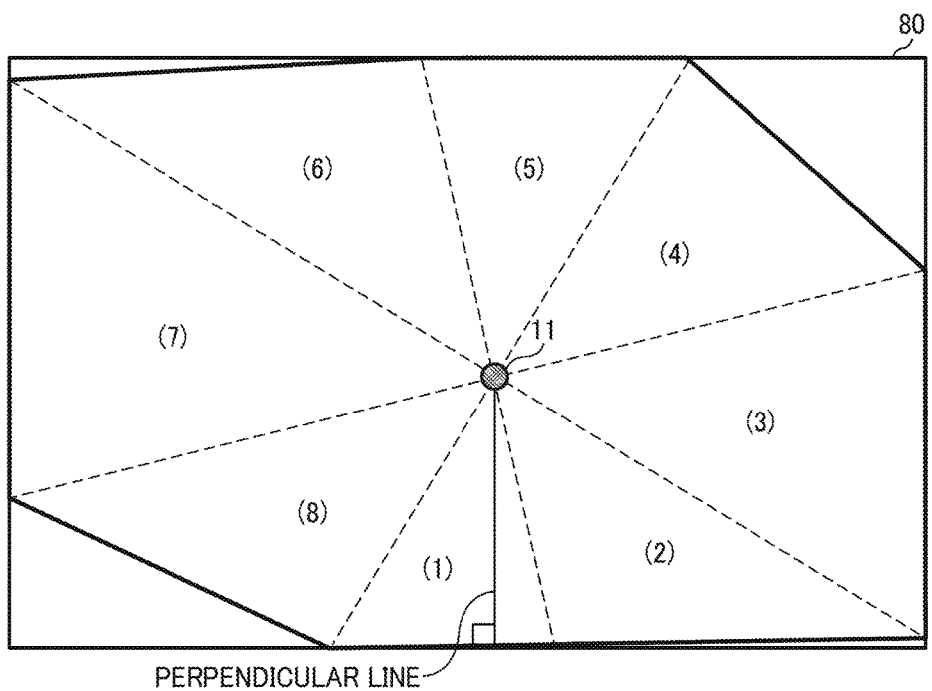
FIG. 10 is a diagram for explaining a method of measuring a size of a room with a camera.

Next, in the processing of S12 described above, the method to measure the size of the room by using the image data from the camera 11 is described using FIG. 10. FIG. 10 is a diagram for explaining a method of measuring the size of a room with a camera.

In the example of FIG. 10, the camera 11 can calculate the focus distance in a particular direction by using the AF function. For example, in the processing of S12 by using the AF function of the camera 11, the communicating apparatus 10 calculates the focus distance to the horizontal distance (for example, the distance from the position of the camera 11 to the position of the wall).

In the example of FIG. 10, the communicating apparatus 10 calculates the eight points of the focus distance at equal intervals (equal angle) (the dotted lines shown in FIG. 10). For example, if the shape of the room 80 is rectangular, the eight points of the focus distance preferably include two points corresponding to each of the walls.

In the second example, as illustrated in FIG. 10 the communicating apparatus 10 forms the triangles to connect each of the focus ((1) to (8) of FIG. 10). After that, the communicating apparatus 10 calculates the length of a perpendicular line in each of the triangles. The length of the perpendicular line is the distance between the camera 11 and the wall.

In the example of FIG. 10, the shortest length of the perpendicular line among the perpendicular lines from the position of the camera 11 to each of the triangles of (1) to (8) is invariably the shortest distance from the position of the camera 11 to the wall. If the camera 11 (the communicating apparatus 10) is placed at the center of the room 80 and the aspect ratio of the room 80 is 2:1 or less, the perpendicular line of each of the triangles (3), (5) and (7) shown in FIG. 10 is the distance to each of the walls.

By using the distance (for example, the shortest distance or the longest distance) to the wall of the room 80 calculated in this way, the communicating apparatus 10 transmits the radio wave according to the size of the room 80. For example, the communication controlling unit 65 transmits the radio wave by the radio wave intensity adjusted to reach the length (distance) of the perpendicular line in the triangle (1) shown in FIG. 10 in order to prevent the radio wave from reaching outside of the room 80. In order for the radio wave to reach the entire room 80, the communication controlling unit 65 transmits the radio wave by the radio wave intensity adjusted to reach the length of the perpendicular line in each of the triangles (3) and (7) shown in FIG. 10. It is possible that the communication controlling unit 65 controls selection of the radio wave to reach the entire room 80 (the entire prescribed area) or transmission of the radio wave by the radio wave intensity adjusted so as not to reach the outside of the room 80 (the outside of the prescribed area).

The communication controlling unit 65 calculates the average value of all calculated focus distances or the average value based on the shortest distance and the longest distance. The communication controlling unit 65 transmits the radio wave by the radio wave intensity adjusted to reach the calculated average value.

Furthermore, the number of calculating the focus distances described above is eight points, but is not limited to this For example, the number may be at least four points. In advance, the number of calculating the focus points is arbitrarily set according to, for example, the scale of the room or the layout of the devices in the room.

<The Third Example of the Communication Control Procedure>

Figure 11:
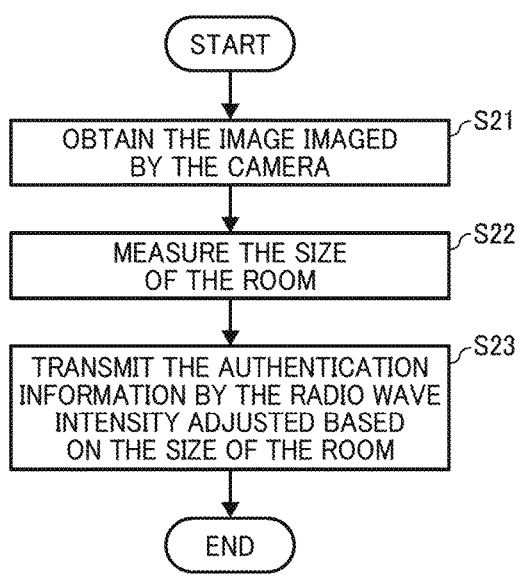
FIG. 11 is a flowchart of a third example of communication controlling procedure.

Next, the third example of the communication control procedure is described. FIG. 11 is a flowchart of a third example of communication controlling procedure. The example of FIG. 11 is an example of the communication control in the case of transmitting the directional radio wave without performing authentication of the person. In the example of FIG. 11, the communicating apparatus 10 in the communicating system 1 obtains the image imaged by the camera 11 (S21). Next, the image analyzing unit 62 analyzes the image obtained by the processing of S21. Next, the image analyzing unit 62 measures the size (for example, the distance to the wall in the room) of the room (S22). Next, the communicating apparatus 10 transmits the authentication information to connect with the network by the radio wave intensity adjusted based on the size of the room obtained by the processing of S22 (S23).

In the third example, it is possible that the communicating apparatus 10 transmits the radio wave by the radio wave intensity according to the direction and the length of the perpendicular line based on the perpendicular line and the perpendicular direction of each of the triangles (1) to (8) as illustrated in FIG. 10.

<The Fourth Example of the Communication Control Procedure>

Next, the fourth example of the communication control procedure is described. The flowchart in the fourth example is the same as the third example shown in FIG. 11. Therefore, a detailed explanation is omitted.

The fourth example is an example of the communication control in the case of transmitting the non-directional radio wave without performing authentication of the person. In the case of the fourth example, in the processing of S23 of FIG. 11, when the communicating apparatus 10 transmits the access information (for example, the authentication information) to connect to the network by the radio wave intensity adjusted based on the size of the room, the communicating apparatus 10 transmits the authentication information by the radio wave intensity according to the prescribed distance (for example, the shortest distance or the longest distance) adjusted based on the perpendicular distance of each of the triangles shown in (1) to (8) of FIG. 10.

Furthermore, it is possible to select the first example to the fourth example described above according to the communication environment (for example, the size or the shape of the room, the set position of the communicating apparatus) or the performance of the communicating apparatus 10 (whether it is possible to authenticate the person or not, whether it is possible to transmit the directional radio wave or the non-directional radio wave). As necessary, the selection of these procedures may be appropriately switched. The procedure of the first example, the second example, the third example and the fourth example may be combined with each other.

In the first example to the fourth example, the communicating apparatus may be executing the processing of limiting the connection while authenticating the connection in regard to the user terminal 15. For example, in the first example to the fourth example, when the communication controlling unit 65 controls/causes the radio wave transmitting/receiving unit 64 to transmit the radio wave, the radio wave transmitting/receiving unit 64 transmits the authentication information of, for example, SSID (Service Set IDentifier) for WiFi communication or PASS (password) by the directional radio wave of, for example, the beam forming. The user terminal 15 accesses the network of the communicating apparatus 10 by using the received SSID or PASS. After that, the user terminal 15 transmits various data (for example, an image or a document) by using the different radio wave (channel) in connection or after connection. In other words, a different radio wave (channel) in connection or after connection is used in order to reinforce network security. Thus, the user terminals 15-1 to 15-*n* can share the various data with each other.

The communication controlling unit 65 changes the authentication information periodically or in the prescribed timing when, for example, it is impossible to determine the recognized person to match the pre-registered person with the processing of the person authentication described above. Thereby, the communication controlling unit 65 can limit access to the network.

Next, in the first to fourth example, the specific example of the radio wave transmission is described. Furthermore, the case of controlling the communication radio wave used to transmit/receive various data (for example, an image or a document) is not described. However, the case of controlling the radio wave (the authentication radio wave) used to transmit the information (the access information, the authentication information) necessary for the authentication on an access (connection) is described below, but is not limited by the following.

<The Specific Example of the Radio Wave Transmission of the First Example (Executing the Person Authentication and Transmitting the Directional Radio Wave)>

Figure 12A:
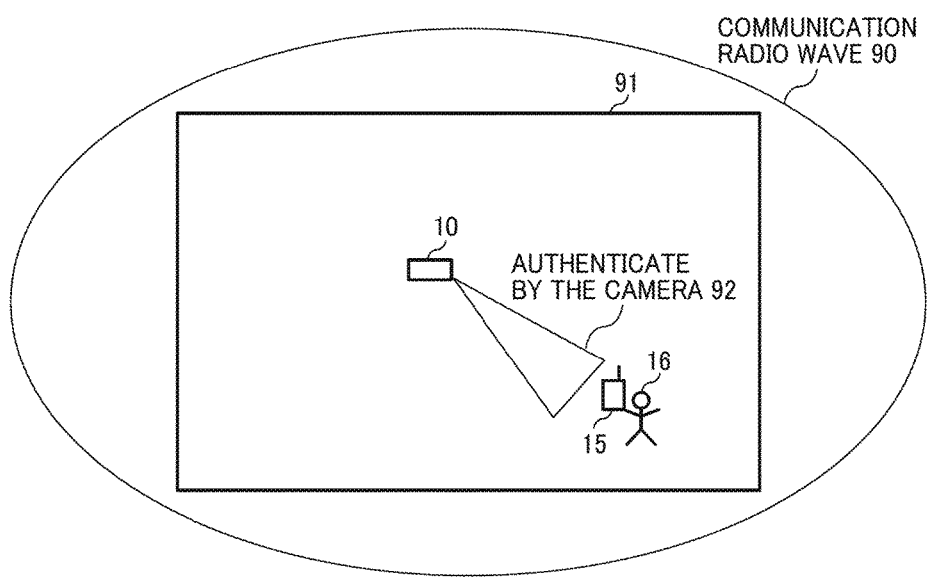
FIGS. 12A and 12B are diagrams for explaining wave transmission corresponding to a first example.
Figure 12B:
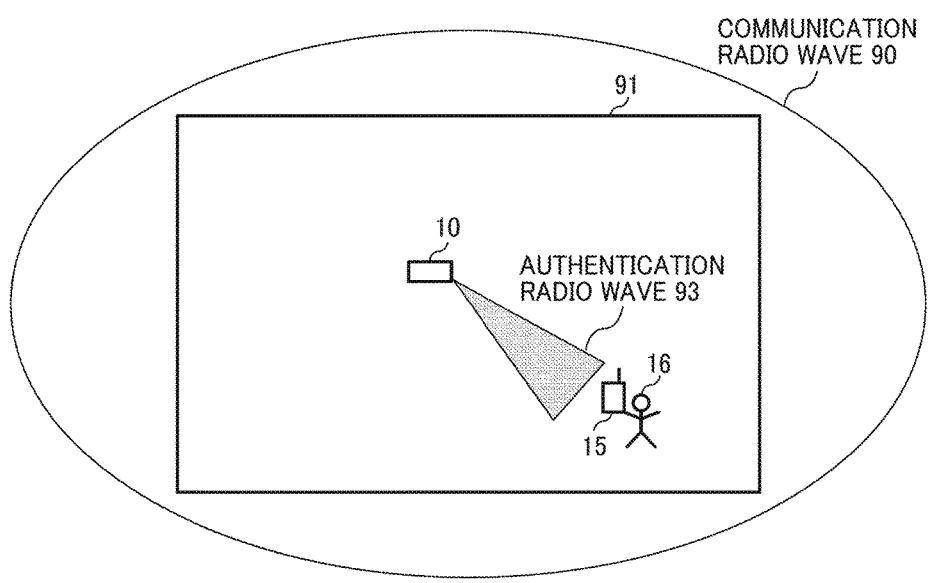

FIG. 12 is a diagram for explaining the specific example of wave transmission corresponding to a first example. The first example indicates the transmission example in the case of the communicating apparatus 10 executing the person authentication described above, and transmitting the directional radio wave. As illustrated in FIGS. 12A and 12B, the first example indicates that it is possible to transmit the communication radio wave 90 of, for example, WiFi in a broader area than the size of the room 91. The second to fourth example described below are also similar.

In this case, the communicating apparatus 10 firstly images an omnidirectional image (the image allowing checking of the entire room 91 for persons present therein) by the camera 11 included in the communicating apparatus 10 or externally connected to the communicating apparatus 10. Next, the communicating apparatus 10 analyses the obtained image and executes the person authentication. If the communicating apparatus 10 recognizes that there is a person in the room 91, the communicating apparatus 10 compares the pre-registered person and the recognized person (the person authentication process). If the result of the person authentication determines that the user 16 is the communication target, the communicating apparatus 10 specifies the direction 92 of the user 16 (FIG. 12A). Next, the communicating apparatus 10 transmits the authentication radio wave 93 (for example, SSID or PASS) in the specified direction 92.

Thereby, it is possible that the user terminal 15 which the user 16 has is available to receive the authentication from the communicating apparatus 10 and connects to the network of the communicating apparatus 10 by using the authentication information included in the received radio wave.

<The Specific Example of the Radio Wave Transmission of the Second Example (Executing the Person Authentication and Transmitting the Non-Directional Radio Wave)>

Figure 13:
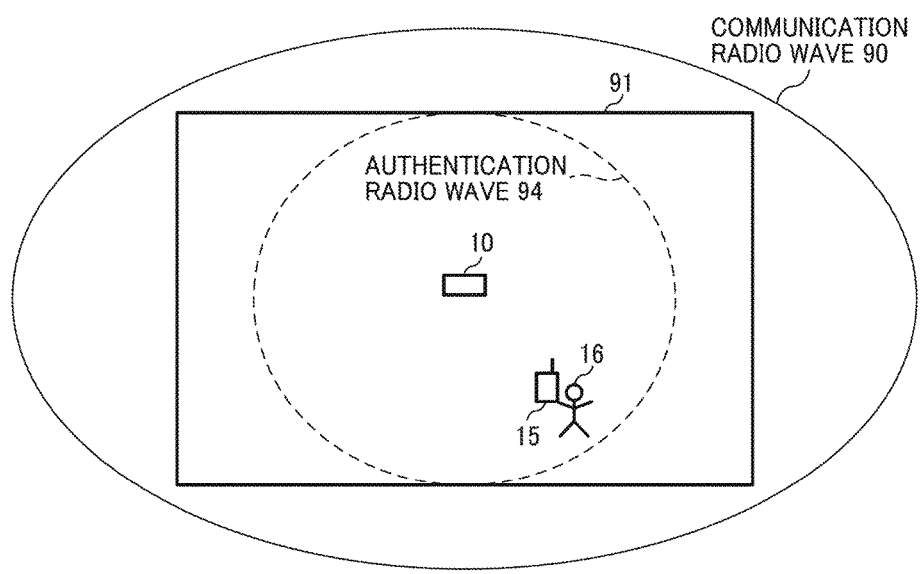
FIG. 13 is a diagram for explaining wave transmission corresponding to a second example.

FIG. 13 is a diagram for explaining the specific example of wave transmission corresponding to a second example. The second example indicates a transmission example in the case of the communicating apparatus 10 executing the person authentication described above, and transmitting the non-directional radio wave.

If the communicating apparatus 10 transmits the non-directional radio wave, the communicating apparatus 10 first measures the size of the room 91 (the size of the physical space).

For example, the communicating apparatus 10 images the omnidirectional image by the camera 11. As illustrated in FIG. 10, the communicating apparatus 10 calculates, by using the obtained image, the size of the room based on the focus distance of each of the directions. Note that, the method of determining the size of the room is not limited to this.

After that, the communicating apparatus 10 recognizes a person by using the image obtained by the camera 11. If the communicating apparatus 10 recognizes that there is a person in the room 91, the communicating apparatus 10 compares the pre-registered person and the recognized person (the person authentication process). If the result of the person authentication determines that the user 16 is the communication target, the communicating apparatus 10 transmits the non-directional authentication radio wave, as illustrated in FIG. 13.

Furthermore, in the example of FIG. 13, the communicating apparatus 10 transmits the authentication radio wave 94 within the shortest distance from the communicating apparatus 10 to the wall of the room 91. Thereby, the authentication radio wave 94 may leak to or reach the outside of the room 91. Furthermore, in the second example if there is a person in the room 91 who is not authenticated by the person authentication process, the communicating apparatus 10 does not transmit the authentication radio wave 94 and displays, for example, a warning.

<The Specific Example of the Radio Wave Transmission of the Third Example (not Executing the Person Authentication and Transmitting the Directional Radio Wave)>

Figure 14:
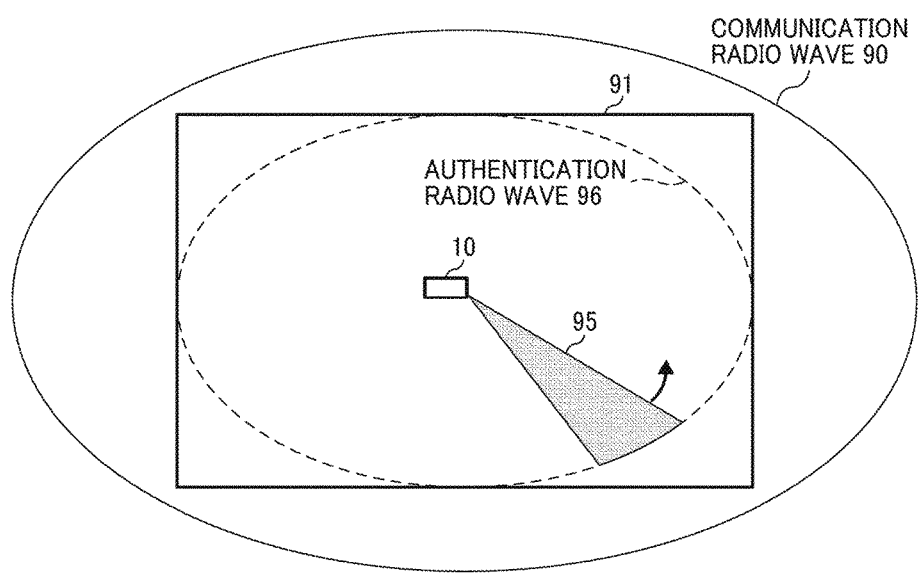
FIG. 14 is a diagram for explaining wave transmission corresponding to a third example.

FIG. 14 is a diagram for explaining the specific example of wave transmission corresponding to a third example. The third example indicates a transmission example in the case of the communicating apparatus 10 not executing the person authentication described above, and transmitting the directional radio wave.

In the third example, after the communicating apparatus 10 measures the size of the room 91, as illustrated in FIG. 14, the communicating apparatus continues to transmit the authentication radio wave 96 including the authentication information by the intensity of the radio wave 95 adjusted based on the size of the room 91.

For example, in the third example as illustrated in FIG. 14, the communicating apparatus 10 circulates the directional radio wave 95 in the prescribed direction for each prescribed interval from the communicating apparatus 10 located at the center. During this time, while the communicating apparatus 10 changes the radio wave intensity in the direction according to the size of the room 91 based on the measured size of the room 91, the communicating apparatus 10 transmits the authentication 96 by the radio wave intensity adjusted to reach of the entire room 91.

<The Specific Example of the Radio Wave Transmission of the Fourth Example (not Executing the Person Authentication and Transmitting the Non-Directional Radio Wave)>

Figure 15:
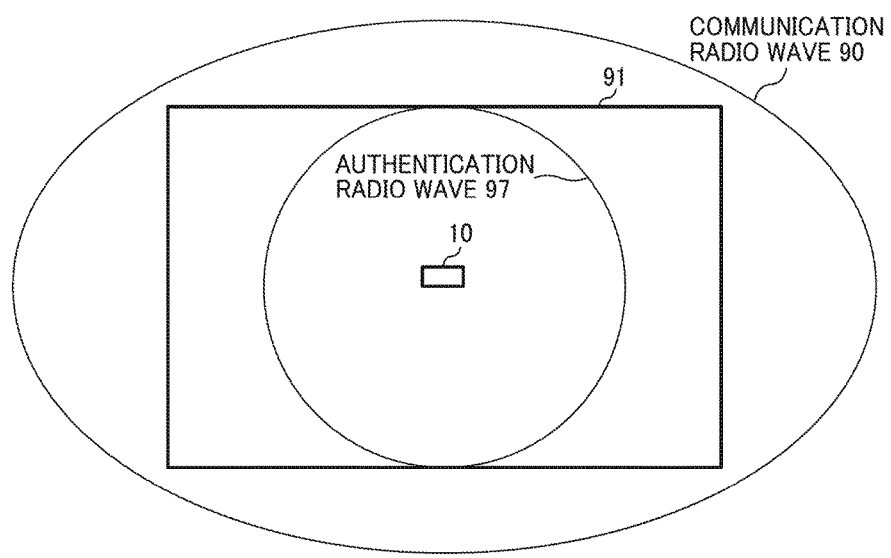
FIG. 15 is a diagram for explaining wave transmission corresponding to a fourth example.

FIG. 15 is a diagram for explaining the specific example of wave transmission corresponding to a fourth example. The fourth example indicates the transmission example in the case of the communicating apparatus 10 not executing the person authentication described above, and further transmitting the non-directional radio wave.

In the fourth example, after the communicating apparatus 10 measures the size of the room, the communicating apparatus 10 transmits the authentication radio wave 97 by the radio wave intensity adjusted based the size of the room 91. Furthermore, in the fourth example, because a person is not being recognized, the communicating apparatus 10 continues to transmit the authentication radio wave 97 regardless of the presence of a user 16 in the room 91. In the case of the fourth example, because of transmitting the non-directional radio wave, the communicating apparatus 10 transmits the radio wave in the entire room 91 (the omni azimuth) by the prescribed intensity.

As described above, in the first embodiment it is possible to change the communication method of the authentication radio wave according to whether a person is recognized or not, and transmit the directional radio wave or the non-directional radio wave in the communicating apparatus 10. In the first to fourth examples described above, it is possible to easily form a network limited in the area to transmit the radio wave.

The Second Embodiment

Next, an example of the communicating system according to a second embodiment is described. In the second embodiment, the communicating apparatus 10 performs, for example, an analysis of the image obtained by the camera, and controls transmitting of the radio wave in, for example, the room, but is not limited to this. For example, an information processing apparatus (for example, a server) existing on the network N1 may be controlling transmitting of the radio wave. Below, the communicating system according to the second embodiment is described by using FIG. 16. The following description discusses configurations similar to the communicating system 1 in the first embodiment and a detailed explanation is therefore omitted.

<System Configuration>

Figure 16:
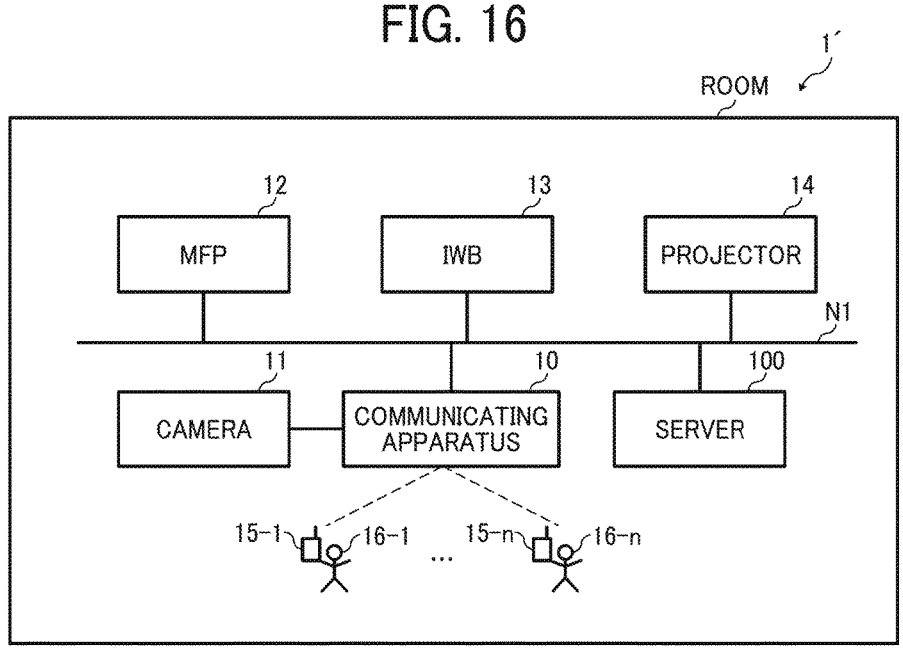
FIG. 16 is a diagram of an exemplary communicating system configuration according to a second embodiment.

FIG. 16 is a diagram of an exemplary communicating system configuration according to the second embodiment. The communicating system 1' shown in FIG. 16 includes a communicating apparatus 10, camera 11, MFP 12, IWB 13, a projector 14, a server 100 (an example of the information processing apparatus), and one or more user terminals 1.

The communicating system 1' connects with the communicating apparatus 10, MFP 12, IWB 13, the projector 14 and the server 100 via the network N1 of, for example, LAN. The network N1 of FIG. 16 may be any of a wired LAN communication or a wireless LAN communication. The server 100 in the communicating system 1' controls/causes one or more user terminals 15 to connect to the network via the communicating apparatus 10. The server 100 realizes the function of, for example, the image obtaining unit 61, the image analyzing unit 62, the person authenticating unit 63, the communication controlling unit 65, the storage unit 66, and the controlling unit 67 among the configurations of the communicating apparatus 10 in FIG. 4 described above by executing the installed application.

The server 100 is, for example, a general server or PC (Personal Computer). The server 100 may be a distributed server or a cloud server which is constituted of not one but plural devices.

For example, in the communication system 1' of the second embodiment, the communicating apparatus 10 transmits the image data obtained by the camera built in to the communicating apparatus 10 or externally mounted on the communicating apparatus 10, to the server 100. The server 100 receives the image obtained by the camera 11 and analyzes the image. If the server 100 recognizes the person in the image, the server 100 determines whether the person is similar to the pre-registered person or not. If the server 100 determines that the person is similar to the pre-registered person, in order to transmit the radio wave in the direction of the person, the server 100 outputs the controlling signal to the communicating apparatus 10.

The communicating apparatus 10 transmits the authentication radio wave including the authentication information to connect with the network N1 or the communication radio wave to the target direction based on the controlling signal from the server 100.

The server 100 executes processes similar to the first to fourth embodiment described above. For example, the server 100 may execute the processing of measuring the size of the room and may transmit the non-directional radio wave according to the size, and may not execute the processing to recognize the person in the image.

<Summary>

As described above, in the present embodiment, it is possible to adjust the area to transmit the radio wave according to the person recognition, by using the camera and grasping the physical space. For example, in the present embodiment, while the network is formed in the prescribed area (for example, the room), the analysis of the image obtained by the camera and the person recognition are executed. In the present embodiment, if it is possible to transmit the directional radio wave (for example, the ultrasonic), the radio wave is transmitted in the direction of the person authenticated as the pre-registered person. In the present embodiment, the radio wave is not transmitted in the direction of the person who is not pre-registered and the connection is cut off.

In the present embodiment, if in the case of the non-directional radio wave being used there is a person not pre-registered (and thus, the person cannot be authenticated), the warning is output and the connection with the user terminal is interrupted or stopped. In the present embodiment, the size of the room is grasped by the camera, thereby the intensity of the communication radio wave is changed accordingly. Thereby, it is possible to easily form a network limited to the transmission area of the radio wave.

<The Supplement of the Embodiment>

The preferred embodiment of the present disclosure is described in detail. However, the disclosure is not limited to this. Various modifications and alterations of the discussed embodiments can be envisioned.

The sequence of the flowchart described in each embodiment may be changed. It is possible to combine all or part of each embodiment described above. Further, all or part of each embodiment described above may be implemented by a program, which may be stored in the storage medium.

What is claimed is:

1. A communicating apparatus that communicates with at least one terminal device, the communicating apparatus comprising:
    circuitry configured to
        capture an image,
        authenticate a person in the image that has been captured,
        determine a direction of the person based on a result of authenticating the person, and control transmission of a radio wave in the determined direction to connect the terminal device to a network, and
        communicate with the terminal device connected to the network by using access information included in the transmitted radio wave, wherein
    the circuitry is further configured to
        calculate a size of a room in which the person is located in each direction based on the image, and calculate a size of an area based on the calculated size of the room,
        adjust a transmission area of the radio wave according to the size of the area, and
        control the radio wave to reach an entirety of the area and adjust radio wave intensity so as to not transmit the radio wave outside of the area.

2. The communicating apparatus according to claim 1, wherein the circuitry is further configured to stop transmitting the radio wave, in response to the person not being authenticated.

3. The communicating apparatus according to claim 1, wherein the circuitry is further configured to output pre-set warning information, in response to the person not being authenticated.

4. The communicating apparatus according to claim 1, wherein the circuitry is further configured to
    transmit the radio wave including the access information to connect to the network using a directional radio wave, and
    limit the terminal device from accessing the network by changing the access information at a predetermined timing.

5. A method for an apparatus that communicates with at least one terminal device, the method comprising:
    capturing an image;
    authenticating a person in the image that has been captured;
    determining a direction of the person based on a result of authenticating the person, and controlling transmission of a radio wave in the determined direction to connect the terminal device to a network; and
    communicating with the terminal device connected to the network by using access information included in the transmitted radio wave, wherein the method further comprises
    calculating a size of a room in which the person is located in each direction based on the image;
    calculating a size of an area based on the calculated size of the room;
    adjusting a transmission area of the radio wave according to the size of the area; and
    controlling the radio wave to reach an entirety of the area and adjusting radio wave intensity so as to not transmit the radio wave outside of the area.

6. The method according to claim 5, further comprising:
    stopping transmission of the radio wave, in response to the person not being authenticated.

7. The method according to claim 5, further comprising:
    outputting pre-set warning information, in response to the person not being authenticated.

8. The method according to claim 5, further comprising:
    transmitting the radio wave including the access information to connect to the network using a directional radio wave; and
    limiting the terminal device from accessing the network by changing the access information at a predetermined timing.

9. A communicating system comprising:
    an imaging apparatus; and
    a communicating apparatus communicating with at least one terminal device, wherein
        the imaging apparatus includes an imaging unit configured to capture an image of the terminal device, and
    the communicating apparatus includes
        an authenticating unit configured to authenticate a person based on the image captured by the imaging unit,
        a communication controlling unit configured to determine a direction of the person based on a result of authenticating the person by the authenticating unit, and control transmission in the determined direction of a radio wave to connect the terminal device to a network, and
        a communicating unit configured to communicate with the terminal device connected to the network by using access information included in the transmitted radio wave,
    the communicating apparatus further includes an image analyzing unit configured to calculate a size of a room in which the person is located in each direction based on the image, and calculate a size of an area based on the calculated size of the room,
    the communication controlling unit is further configured to adjust a transmission area of the radio wave according to the size of the area, and
    the communication controlling unit is further configured to control the radio wave to reach an entirety of the area and adjust radio wave intensity so as to not transmit the radio wave outside of the area.

10. The communicating system according to claim 9, wherein the communication controlling unit is further configured to stop transmitting the radio wave, in response to the person not being authenticated.

11. The communicating system according to claim 9, wherein the communication controlling unit is further configured to output pre-set warning information, in response to the person not being authenticated.

12. The communicating system according to claim 9, wherein the communication controlling unit is further configured to transmit the radio wave including the access information to connect to the network using a directional radio wave, and limit the terminal device from accessing the network by changing the access information at a predetermined timing.

* * * * *